United States Patent
Takahashi et al.

(10) Patent No.: US 7,158,394 B2
(45) Date of Patent: Jan. 2, 2007

(54) SWITCHING POWER SUPPLY CIRCUIT WITH A SOFT-START FUNCTION

(75) Inventors: Seiichi Takahashi, Sagamihara (JP); Takayoshi Nishiyama, Kyoto (JP); Jun Nagai, Nagaokakyo (JP); Eito Moromizato, Nagaokakyo (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 0 days.

(21) Appl. No.: 10/547,412

(22) PCT Filed: Feb. 10, 2005

(86) PCT No.: PCT/JP2005/002042

§ 371 (c)(1),
(2), (4) Date: Aug. 30, 2005

(87) PCT Pub. No.: WO2005/101629

PCT Pub. Date: Oct. 27, 2005

(65) Prior Publication Data

US 2006/0164871 A1   Jul. 27, 2006

(30) Foreign Application Priority Data

Apr. 12, 2004  (JP) ............................. 2004-117030

(51) Int. Cl.
  H02H 7/10   (2006.01)
  H02H 7/122  (2006.01)

(52) U.S. Cl. ...................... 363/49; 363/55; 363/56.01; 323/901

(58) Field of Classification Search ............... 363/49, 363/50, 55, 56.01, 20; 323/901
See application file for complete search history.

(56) References Cited

U.S. PATENT DOCUMENTS

| | | | | |
|---|---|---|---|---|
| 4,887,199 | A | * | 12/1989 | Whittle ........................ 363/49 |
| 4,937,724 | A | * | 6/1990 | Nakajima ................... 363/56.1 |
| 5,903,451 | A | * | 5/1999 | Wu et al. ..................... 363/49 |
| 6,348,833 | B1 | | 2/2002 | Tsujimoto et al. |
| 6,414,860 | B1 | * | 7/2002 | Li ................................ 363/49 |
| 6,912,141 | B1 | * | 6/2005 | Konno ......................... 363/49 |
| 6,975,521 | B1 | * | 12/2005 | Konno ..................... 363/21.08 |

FOREIGN PATENT DOCUMENTS

JP    07-336999    12/1995

(Continued)

*Primary Examiner*—Bao Q. Vu
(74) *Attorney, Agent, or Firm*—Keating & Bennett, LLP

(57) ABSTRACT

A switching power supply circuit reduces the time from start-up driving to normal operation while a soft-start is carried out with an output voltage Vout. A soft-start capacitor is charged during the start-up time. After a soft-start voltage Vz has reached a predetermined signal-output starting voltage Vlow, soft start of the output voltage Vout is carried out by controlling the operation based on the soft-start voltage Vz. A time constant for charging the soft-start capacitor is set as a time constant that causes the charge voltage of the soft-start capacitor to sharply increase at least until the soft-start voltage Vz reaches the signal-output starting voltage Vlow after the circuit has started driving, and is switched to a time constant that causes a rising trend of the charge voltage of the soft-start capacitor to become gentle with a predetermined time-constant switching timing. The start-up time is reduced by an amount equivalent to a reduction in the delay time from the start of driving to the start of voltage output.

18 Claims, 6 Drawing Sheets

FOREIGN PATENT DOCUMENTS

| | | |
|---|---|---|
| JP | 08-317637 | 11/1996 |
| JP | 2000-56843 | 2/2000 |
| JP | 2000-66628 | 3/2000 |
| JP | 2000-224843 | 8/2000 |
| JP | 2001-128445 | 5/2001 |
| JP | 3394915 | 1/2003 |
| JP | 2004-297983 | 10/2004 |

* cited by examiner

SWITCHING POWER SUPPLY CIRCUIT WITH A SOFT-START FUNCTION

BACKGROUND OF THE INVENTION

1. Field of the Invention

The present invention relates to a switching power supply circuit with a soft-start function for gently raising an output voltage during a start-up time.

2. Description of the Related Art

FIG. 6 shows one example of a main part of the circuit structure of a switching power supply circuit. This switching power supply circuit 1 includes a transformer 2. A main switching element (e.g., MOSFET) Q is connected in series to a primary coil N1 of this transformer 2. An external input power supply E is connected in parallel to a circuit composed of the primary coil N1 and the main switching element Q connected in series. A secondary rectifying and smoothing circuit 3 is connected to a secondary coil N2 of the transformer 2, and a load 4 is connected to this secondary rectifying and smoothing circuit 3.

A control circuit 5 is connected to the main switching element Q. This control circuit 5 outputs an ON/OFF pulse signal (switching-control signal), as shown in FIG. 7, to the main switching element Q and controls the switch ON/OFF operation of the main switching element Q. With the switch ON/OFF operation of the main switching element Q based on the control operation of the control circuit 5, electric current flows from the input power supply E to the primary coil N1, which causes a voltage to be output from the secondary coil N2. The voltage output from this secondary coil N2 is rectified and smoothed in the secondary rectifying and smoothing circuit 3, and a DC voltage Vout that has been rectified and smoothed is output to the load 4.

The switching power supply circuit 1 is provided with a detection circuit 6 for directly or indirectly detecting the output voltage Vout output from the switching power supply circuit 1 to the load 4. A detection voltage Vs for the output voltage Vout of the switching power supply circuit 1 is added to the control circuit 5 from this detection circuit 6. The control circuit 5 controls the switch ON/OFF operation of the main switching element Q based on the detection voltage Vs so that the output voltage Vout is stabilized to a predetermined set normal-operation output voltage Vp, as shown in FIG. 7. For example, the control circuit 5 includes an error amplifier 8, a reference power supply 9, a comparator 10, and a triangular-wave generating circuit 11 and controls the switch ON/OFF operation of the main switching element Q by using the PWM method.

More specifically, the error amplifier (error amplifier) 8 amplifies and outputs the differential voltage between the detection voltage Vs output from the detection circuit 6 and a reference voltage Vref of the reference power supply 9. A comparator 10 compares a voltage Ve output from the error amplifier 8 with a triangular wave voltage S, as shown in FIG. 7, output from the triangular-wave generating circuit 11. The comparator 10 then outputs an ON signal of the pulse signal shown in FIG. 7, for example, while a voltage value of the triangular wave voltage S is equal to or below the output voltage Ve of the error amplifier 8. On the other hand, the comparator 10 outputs an OFF signal of the pulse signal while a voltage value of the triangular wave voltage S is above the output voltage Ve of the error amplifier 8. A pulse signal output from this comparator 10 is added to the main switching element Q as the switching-control signal.

The control circuit 5 with the above-described structure controls the output voltage Vout to decrease to the set normal-operation output voltage Vp when, for example, the output voltage Vout exceeds the normal-operation output voltage Vp. In other words, the control circuit 5 shortens the pulse width of an ON signal of the switching-control signal to be added to the main switching element Q. This causes the output voltage Vout to decrease towards the normal-operation output voltage Vp. In contrast, when the output voltage Vout falls below the normal-operation output voltage Vp, the control circuit 5 performs control such that the decrease in the output voltage Vout relative to the normal-operation output voltage Vp is compensated for. More specifically, the control circuit 5 widens the pulse width of an ON signal of the switching-control signal to the main switching element Q. This causes the output voltage Vout to increase towards the normal-operation output voltage Vp.

A sharp rise of the output voltage Vout when the switching power supply circuit 1 starts up causes a significantly large overshoot voltage compared with the normal-operation output voltage Vp to occur. This overshoot voltage is added from the switching power supply circuit 1 to the load 4. As a result of the overshoot voltage being applied, a failure, such as latch-up, may occur in the load 4, possibly preventing the load 4 from starting up smoothly.

For this reason, the switching power supply circuit 1 shown in FIG. 6 is provided with a soft-start circuit 130. This soft-start circuit 130 includes a switching element (e.g., transistor element) 14, a resistor 15, a soft-start operation power supply 16, and a time-constant circuit 19. The time-constant circuit 19 is realized by, for example, a series circuit composed of a resistor 17 and a soft-start capacitor 18.

The switching power supply circuit 1 is provided with a start-up circuit 20 connected to the base of the switching element 14. When the switching power supply circuit 1 starts up, a voltage is applied from the start-up circuit 20 to the base of the switching element 14. As a result, the switching element 14 is switched from a switch ON state to a switch OFF state.

While the switching element 14 is in a switch ON state, the soft-start operation power supply 16 is electrically connected to the ground through the resistors 15 and 17 and the switching element 14. When the switching element 14 is switched from a switch ON state to a switch OFF state, the soft-start operation power supply 16 becomes electrically connected to the soft-start capacitor 18 through the resistor 17. As a result, the soft-start capacitor 18 is charged with a time constant determined by the capacitance of the capacitor 18 and the resistance of the resistor 17. A charge voltage Vz for the soft-start capacitor 18 gradually increases over time during the start-up time, for example, as shown in FIG. 7.

This charge voltage Vz for the soft-start capacitor 18 is applied to the comparator 10 of the control circuit 5 as a soft-start voltage. During the start-up time, the comparator 10 produces the switching-control signal, as described above, based on the charge voltage (soft-start voltage) Vz for the soft-start capacitor 18 and the triangular wave voltage S of the triangular-wave generating circuit 11. More specifically, the comparator 10 starts output of the switching-control signal after the charge voltage Vz for the soft-start capacitor 18 has reached the minimum level (signal-output starting voltage) Vlow of the triangular wave voltage S. Thereafter, the comparator 10 produces the switching-control signal based on the charge voltage Vz for the soft-start capacitor 18 and the triangular wave voltage S, and outputs the switching-control signal to the main switching element Q. Once a normal operation period has been reached after the start-up time, the comparator 10 produces the switching-control signal based on the output voltage Ve of the error amplifier 8 and the triangular wave voltage S, and outputs the switching-control signal to the main switching element Q.

During the start-up time, the main switching element Q starts switching operation in response to the switching-control signal being applied. With this switching operation, the output voltage Vout is output from the switching power supply circuit 1. With a gentle increase in the charge voltage Vz for the soft-start capacitor 18, the pulse width of the ON signal of the switching-control signal gradually widens, as shown in FIG. 7. As a result, the output voltage Vout of the switching power supply circuit 1 gently increases, as shown in FIG. 7. In other words, the switching power supply circuit 1 performs a soft start with the soft-start circuit 130. See, for example, Japanese Patent No. 3394915.

For the structure of the switching power supply circuit 1 shown in FIG. 6, output of the switching-control signal from the comparator 10 to the main switching element Q is started after the charge voltage Vz for the soft-start capacitor 18 has reached the predetermined signal-output starting voltage Vlow (the minimum level Vlow of the triangular wave voltage S of the triangular-wave generating circuit 11). The switching power supply circuit 1 then starts output of the DC voltage Vout. In other words, despite that the switching power supply circuit 1 starts driving, the switching power supply circuit 1 does not output the output voltage Vout until the charge voltage Vz for the soft-start capacitor 18 reaches the signal-output starting voltage Vlow.

For the structure of the soft-start circuit 130 shown in FIG. 6, the delay time from when the switching power supply circuit 1 starts driving to when output of the output voltage Vout is started, and the output rising time from when the switching power supply circuit 1 starts output of the output voltage Vout until the normal-operation output voltage Vp is reached, are determined by a time constant for charging the soft-start capacitor 18 in the time-constant circuit 19. In short, the time constant of the delay time is equal to that of the output rising time (in other words, the time constant for charging the soft-start capacitor 18 is constant over the entire start-up period of time).

For this reason, the soft-start capacitor 18 is gently charged during the period of time from when the switching power supply circuit 1 starts driving until the charge voltage Vz for the soft-start capacitor 18 reaches the signal-output starting voltage Vlow, despite no output of the output voltage Vout. Therefore, the delay time (the period of time from when the switching power supply circuit 1 starts driving until output of the output voltage Vout is started) becomes longer.

Thus, a problem to be overcome is described as a long time from when the switching power supply circuit 1 starts driving until the output voltage Vout reaches the normal-operation output voltage Vp.

SUMMARY OF THE INVENTION

In order to overcome the problems described above, preferred embodiments of the present invention provide a switching power supply circuit that significantly reduces the time from start-up driving to normal operation while a soft-start is carried out with an output voltage.

According to a preferred embodiment of the present invention, a switching power supply circuit includes a main switching element arranged to control an output voltage output from the switching power supply circuit with a switch ON/OFF operation, a soft-start circuit arranged to output a soft-start voltage whose voltage value increases over time during a start-up time from when the switching power supply circuit starts driving to when the output voltage of the switching power supply circuit reaches a predetermined normal-operation output voltage, and a control circuit arranged to start an output of a switching-control signal of the main switching element based on the soft-start voltage after the soft-start voltage reaches a predetermined signal-output starting voltage to control the switch ON/OFF operation of the main switching element and to cause the output voltage of the switching power supply circuit to gently rise towards the normal-operation output voltage, wherein the soft-start circuit includes a time-constant circuit having a soft-start capacitor which is charged during the start-up time, the soft-start circuit outputs a charge voltage of the soft-start capacitor as the soft-start voltage, the soft-start circuit includes a time-constant switching control circuit for controlling the switching of a time constant for charging the soft-start capacitor during the start-up time, and the time-constant switching control circuit sets a time constant that causes the charge voltage of the soft-start capacitor to sharply increase at least until the charge voltage of the soft-start capacitor reaches the signal-output starting voltage after the switching power supply circuit starts driving and switches to a time constant that causes a rising trend of the charge voltage of the soft-start capacitor to become gentle with a predetermined time-constant switching timing after the charge voltage of the soft-start capacitor reaches the signal-output starting voltage.

According to a present preferred embodiment of the present invention, the soft-start circuit includes the time-constant switching control circuit. This time-constant switching control circuit sets a time constant that causes the charge voltage of the soft-start capacitor to sharply increase at least until the charge voltage of the soft-start capacitor reaches a voltage at which output of the switching-control signal is started (the signal-output starting voltage) after the switching power supply circuit starts driving. For this reason, the soft-start capacitor is quickly charged from when the switching power supply circuit starts driving until voltage output of the switching power supply circuit is started. Therefore, the period of time from when the switching power supply circuit starts driving to when output of the output voltage from the switching power supply circuit is started can be reduced.

Furthermore, in a preferred embodiment of the present invention, the time-constant switching control circuit switches to a time constant that causes the rising trend of the charge voltage of the soft-start capacitor to become gentle with a predetermined time-constant switching timing during the start-up time after the charge voltage of the soft-start capacitor reaches the signal-output starting voltage. For this reason, the charge voltage of the soft-start capacitor (soft-start voltage) gently increases during the start-up time after the time-constant switching timing. As a result, the output voltage of the switching power supply circuit gently rises with the switching-control signal based on the soft-start voltage.

As described above, a preferred embodiment of the present invention achieves gentle rising of the output voltage of the switching power supply circuit. In addition, the delay time from when the switching power supply circuit starts driving to when voltage output is started is reduced. With this reduction in the delay time, the start-up time from when the switching power supply circuit starts driving to when the output voltage of the switching power supply circuit reaches the set normal-operation output voltage can be reduced.

Other features, elements, advantages and characteristics of the present invention will become more apparent from the following detailed description of preferred embodiments thereof with reference to the attached drawings.

DETAILED DESCRIPTION OF PREFERRED EMBODIMENTS

Figure 6:
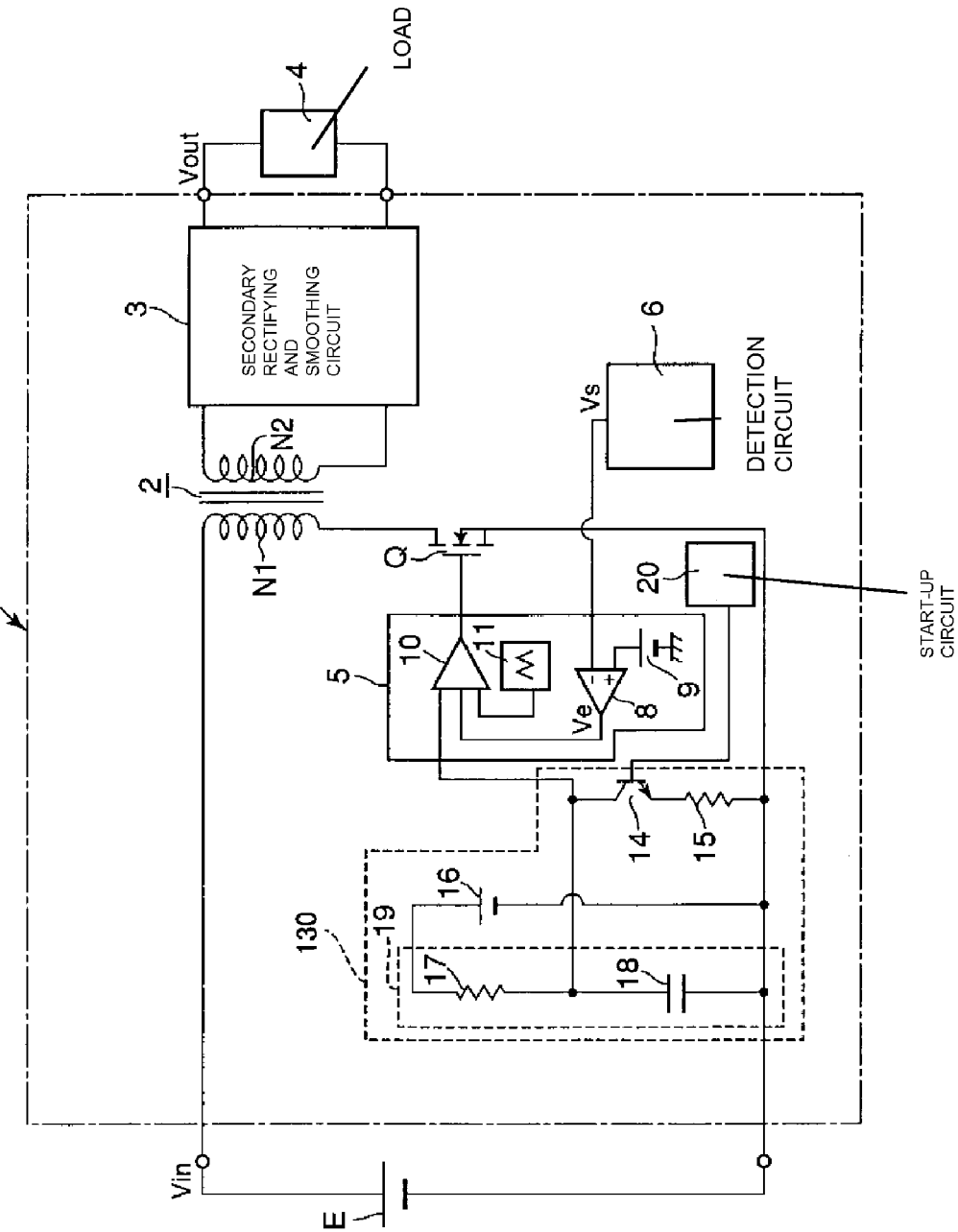
FIG. 6 is a circuit diagram depicting an example of a known switching power supply circuit.
Figure 7:
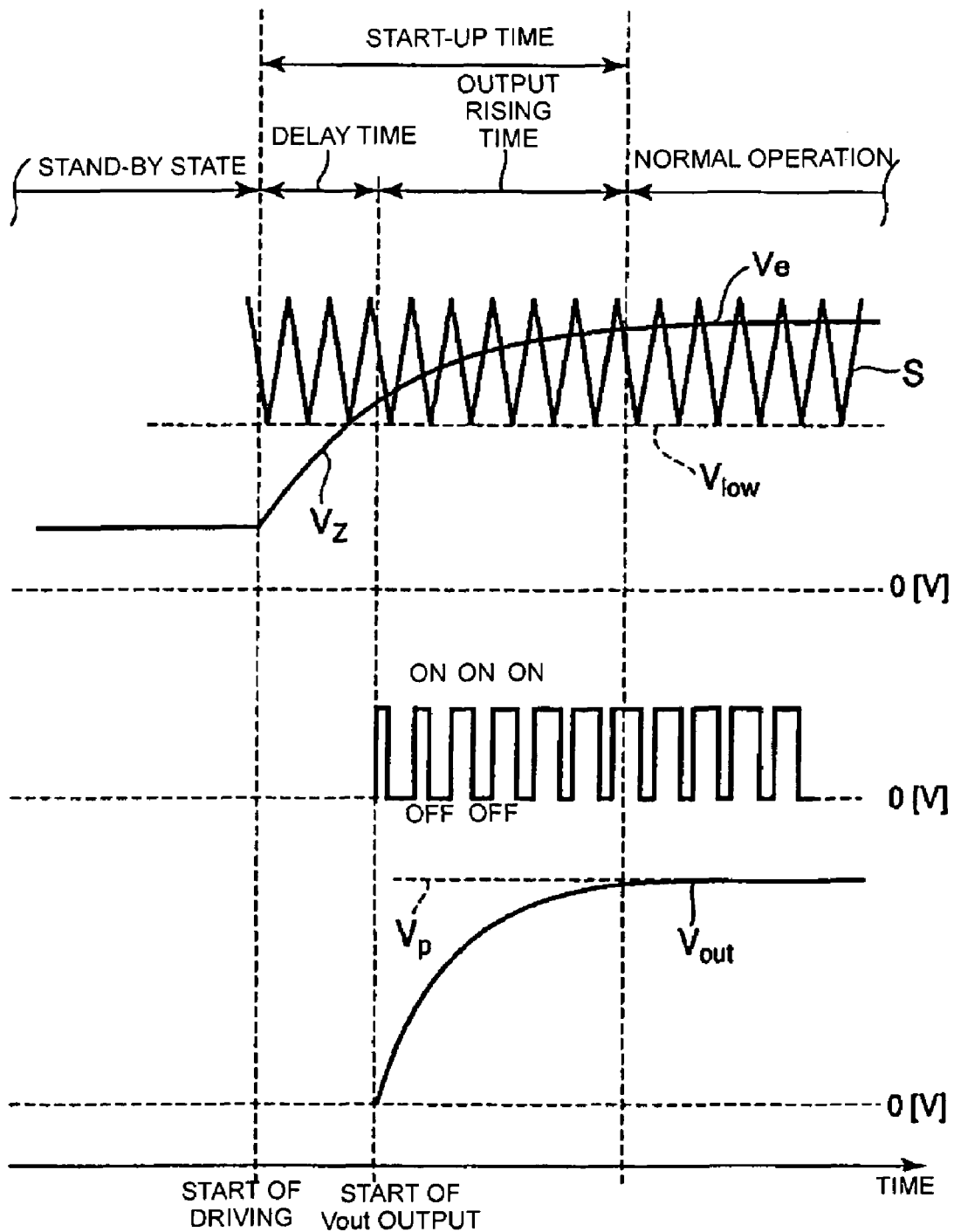
FIG. 7 is a diagram illustrating the circuit operation of the switching power supply circuit shown in FIG. 6.

Various preferred embodiments according to the present invention will now be described with reference to the drawings. In the following preferred embodiments, the components that are the same as or equivalent to those used in the circuit shown in FIG. 6 are denoted by the same reference numerals, and thus such components denoted with the same reference numerals will not be described or will be described only briefly. Furthermore, in cross-reference to other preferred embodiments, the same or equivalent components are denoted by the same reference numerals and components that have been described in a previous preferred embodiment and will not be described or will be described only briefly in another preferred embodiment.

Figure 1:
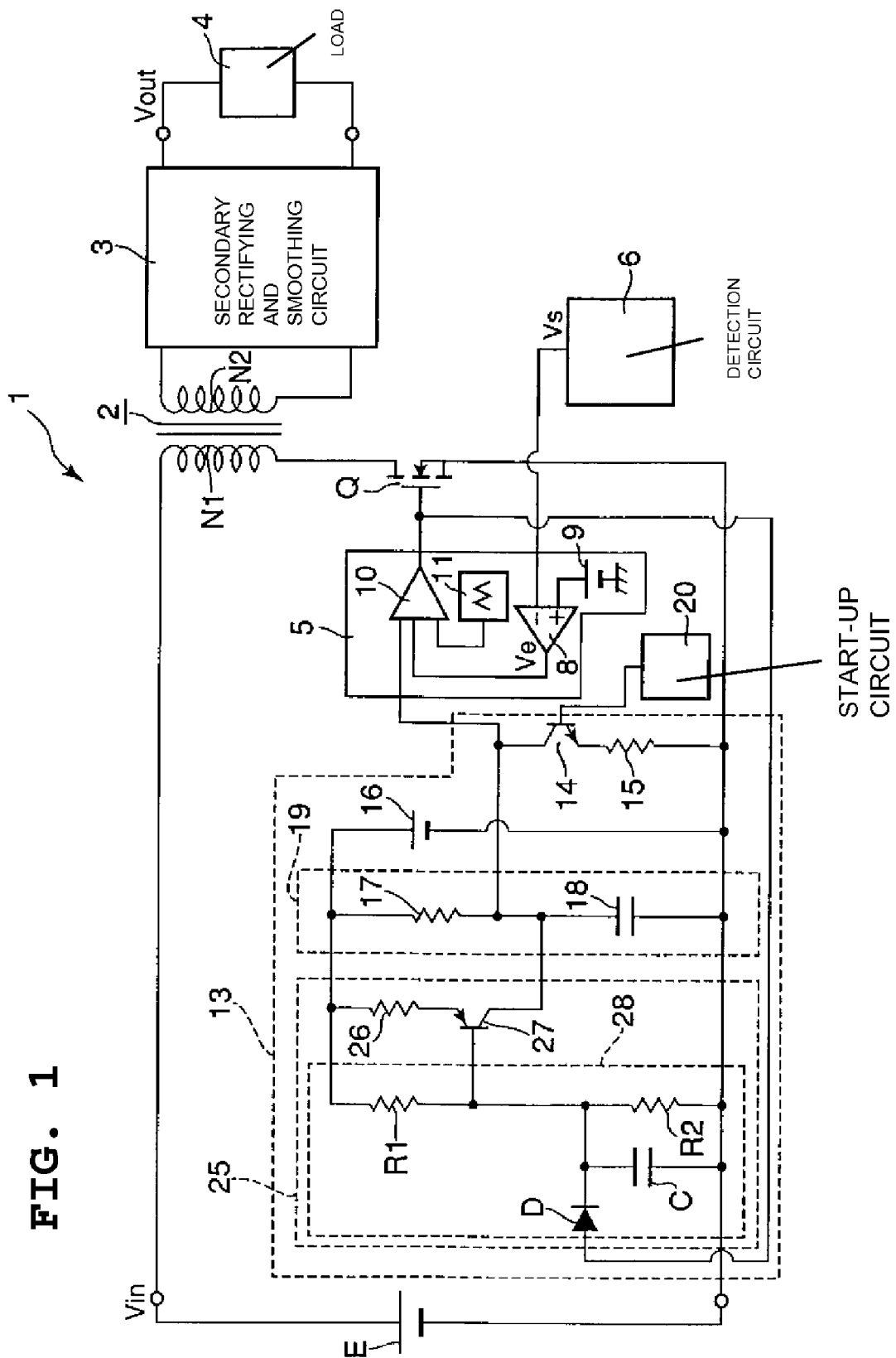
FIG. 1 is a circuit diagram depicting the main constituent parts of a switching power supply circuit according to a first preferred embodiment of the present invention.

FIG. 1 shows the main circuit constituent parts of a switching power supply circuit according to a first preferred embodiment of the present invention. A switching power supply circuit 1 according to this first preferred embodiment includes a soft-start circuit 13 which includes a time-constant switching control circuit 25 as described below. Except for the soft-start circuit 13, the structure according to this first preferred embodiment is the same as that of the switching power supply circuit 1 in FIG. 6.

The time-constant switching control circuit 25 according to this first preferred embodiment includes a circuit structure for controlling, during the start-up time, the switching of the time constant for charging a soft-start capacitor 18 of a time-constant circuit 19 with a predetermined time-constant switching timing. The time-constant switching control circuit 25 includes a circuit preferably having a resistor 26 and a switch section (e.g., transistor element) 27 connected in series and a switch control section 28 for controlling the switching operation of the switch section 27. The circuit including the resistor 26 and the switch section 27 connected in series is connected in parallel to a resistor 17.

In this first preferred embodiment, the time-constant switching timing during the start-up time is set as a point in time when a charge voltage (soft-start voltage) Vz for the soft-start capacitor 18 has reached a minimum level (signal-output starting voltage) Vlow of a triangular wave voltage S of a triangular-wave generating circuit 11. When the charge voltage Vz for the soft-start capacitor 18 reaches the signal-output starting voltage Vlow, the output of a switching-control signal is started from a control circuit 5 to a main switching element Q, and the switching operation of the main switching element Q is started. For this reason, the signal input terminal of the switch control section 28 receiving a signal from the control circuit 5 is connected to the conducting route from the control circuit 5 to the main switching element Q.

The switch control section 28 includes a structure for detecting the start of output of the switching-control signal from the control circuit 5 to the main switching element Q as the time-constant switching timing. The switch control section 28 includes a structure for controlling the switching of the switch section 27 from an ON operation to an OFF operation with the set time-constant switching timing by using the switching-control signal. The circuit structure of this switch control section 28 is not limited to a particular one, as long as it can control the switching of the switch section 27 from an ON operation to an OFF operation with the set time-constant switching timing during the start-up time. FIG. 1 shows one example circuit structure of the switch control section 28. More specifically, in the example shown in FIG. 1, the switch control section 28 includes a diode D, a smoothing capacitor C, and resistors R1 and R2.

In this first preferred embodiment, the switch section 27 is controlled to be in an ON operation during the period of time from when the switching power supply circuit 1 starts driving until the time-constant switching timing. With an ON operation of the switch section 27 during this start-up time, electric current based on a soft-start operation power supply 16 flows to the routes described below. More specifically, electric current from the soft-start operation power supply 16 branches into a route to the soft-start capacitor 18 through the resistor 17 and a route to the soft-start capacitor 18 through the resistor 26 and the switch section 27, thus flowing in the soft-start capacitor 18. The soft-start capacitor 18 is thus charged.

Figure 2:
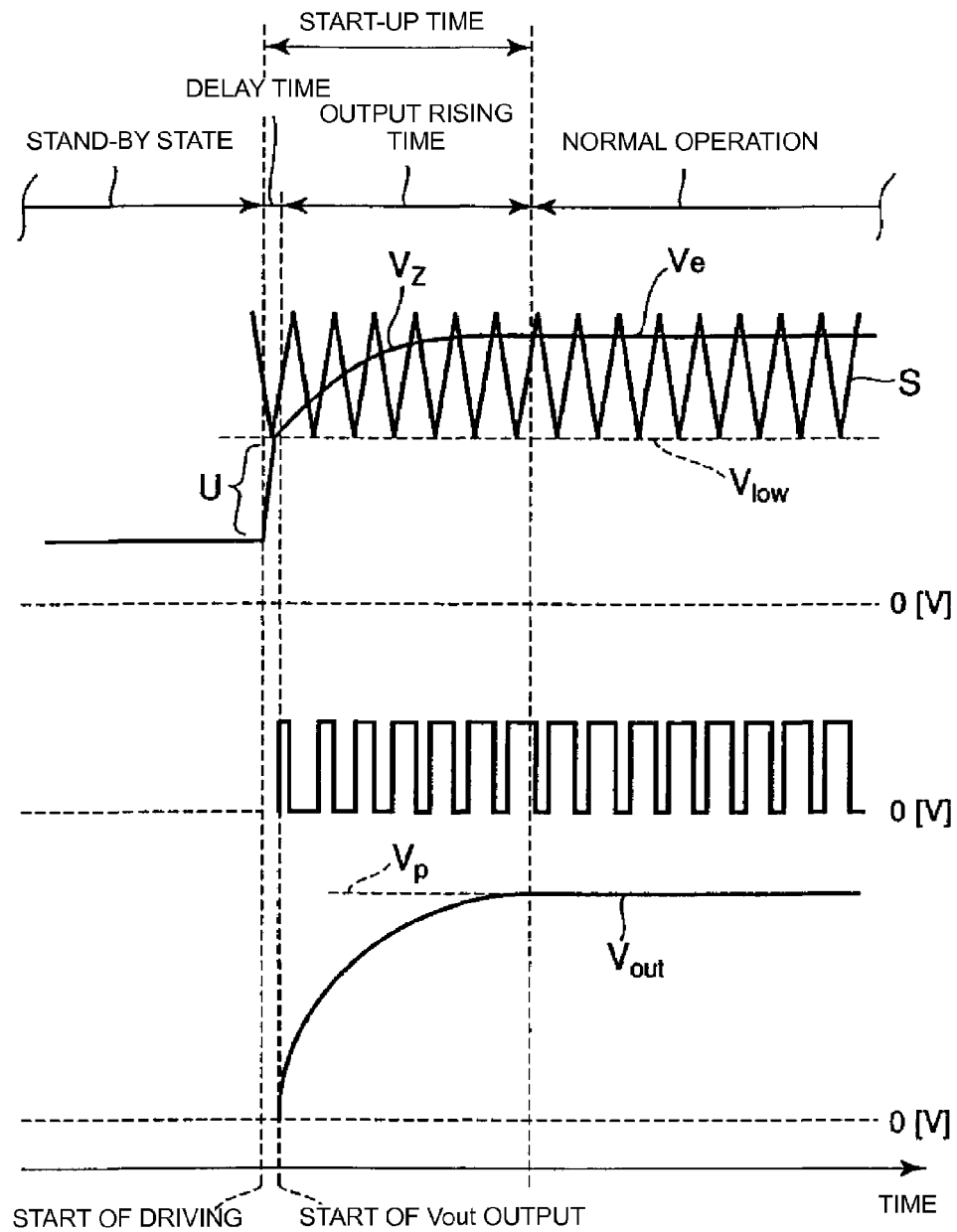
FIG. 2 is a time chart illustrating an example circuit operation according to the first preferred embodiment of the present invention.

For this reason, the time constant for charging the soft-start capacitor 18 while the switch section 27 is in an ON operation during the start-up time is a time constant based on the resistance of the parallel circuit of the resistors 17 and 26 and the capacitance of the soft-start capacitor 18. In this first preferred embodiment, while this switch section 27 is in an ON operation, the time constant for charging the soft-start capacitor 18 is set such that the charge voltage for the soft-start capacitor 18 sharply increases, as indicated by symbol U in FIG. 2.

After the switch section 27 has been switched from an ON operation to an OFF operation with the set time-constant switching timing through the switching control of the switch control section 28 during the start-up time, the circuit operation is carried out as described below. That is, electric current based on the soft-start operation power supply 16 does not flow in the resistor 26 due to an OFF operation of the switch section 27. Therefore, electric current based on the soft-start operation power supply 16 flows to the soft-start capacitor 18 via a charge route from the soft-start operation power supply 16 through the resistor 17 to the soft-start capacitor 18. The soft-start capacitor 18 is thus charged.

The time constant for charging the soft-start capacitor 18 at this time is a time constant based on the resistance of the resistor 17 and the capacitance of the soft-start capacitor 18. More specifically, switching is carried out such that the resistance of the charge route from the soft-start operation power supply 16 to the soft-start capacitor 18 increases through the ON/OFF operation switching of the switch section 27 with the set time-constant switching timing during the start-up time.

As a result, the time constant for charging the soft-start capacitor 18 while the switch section 27 in an OFF operation is switched to a time constant that causes the rising trend of the charge voltage for the soft-start capacitor 18 to be more gentle than the time constant while the switch section 27 is in an ON operation. In this first preferred embodiment, after the switch section 27 has been switched from an ON operation to an OFF operation with the set time-constant switching timing, the rising trend of the charge voltage for the soft-start capacitor 18 becomes gentle. In the first preferred embodiment, as described above, the time constant for charging the soft-start capacitor 18 is set such that the rising trend of the charge voltage for the soft-start capacitor 18 becomes gentle to achieve a soft start of an output voltage Vout.

More specifically, in the first preferred embodiment, a time constant that causes the charge voltage Vz for the soft-start capacitor 18 to sharply increase is produced during the period of time from when the switching power supply circuit 1 starts driving until the set time-constant switching timing during the start-up time. After the time-constant switching timing, the rising trend of the charge voltage Vz for the soft-start capacitor 18 becomes gentle to produce a time constant that causes a soft start of the output voltage Vout to be achieved. As described above, the resistances of the resistors 17 and 26 and the capacitance of the soft-start capacitor 18 are designed so that the time constant before the time-constant switching timing and the time constant after the time-constant switching timing become the above-described time constants.

Therefore, in this first preferred embodiment, the charge voltage Vz for the soft-start capacitor 18 sharply increases until the charge voltage (soft-start voltage) Vz for the soft-start capacitor 18 reaches the signal-output starting voltage Vlow after the switching power supply circuit 1 has started driving. As a result, the delay time of the output voltage Vout relative to the time when the switching power supply circuit 1 starts driving is reduced. Furthermore, after output of the output voltage Vout from the switching power supply circuit 1 is started up, the rising trend of the charge voltage Vz for the soft-start capacitor 18 becomes gentle. Because of this, the soft start of the output voltage Vout is achieved.

In addition, the time-constant switching control circuit 25 variably switches the resistance from among the resistance and capacitance that determine the time constant for charging the soft-start capacitor 18 (variably switches the resistance of the charge route from the soft-start operation power supply 16 to the soft-start capacitor 18) to control the switching of the time constant for charging the soft-start capacitor 18. Therefore, the time-constant switching control circuit 25 can be constructed with a simple circuit. With the time-constant switching control circuit 25, the above-described advantage (i.e., the advantage of carrying out soft start of output voltage while reducing the start-up time) is achieved while still preventing the circuit structure from becoming complicated.

Furthermore, the time-constant switching timing by the time-constant switching control circuit 25 is set as a point in time when the charge voltage of the soft-start capacitor reaches the signal-output starting voltage. According to the first preferred embodiment, the detection structure of the time-constant switching timing is realized as a structure for detecting the start of output of the switching-control signal from the control circuit 5 to the main switching element Q as the time-constant switching timing. Because of this, the time-constant switching timing is detected with a simple circuit. The time constant for charging the soft-start capacitor 18 can be switched with a high-accuracy set time-constant switching timing.

Figure 3:
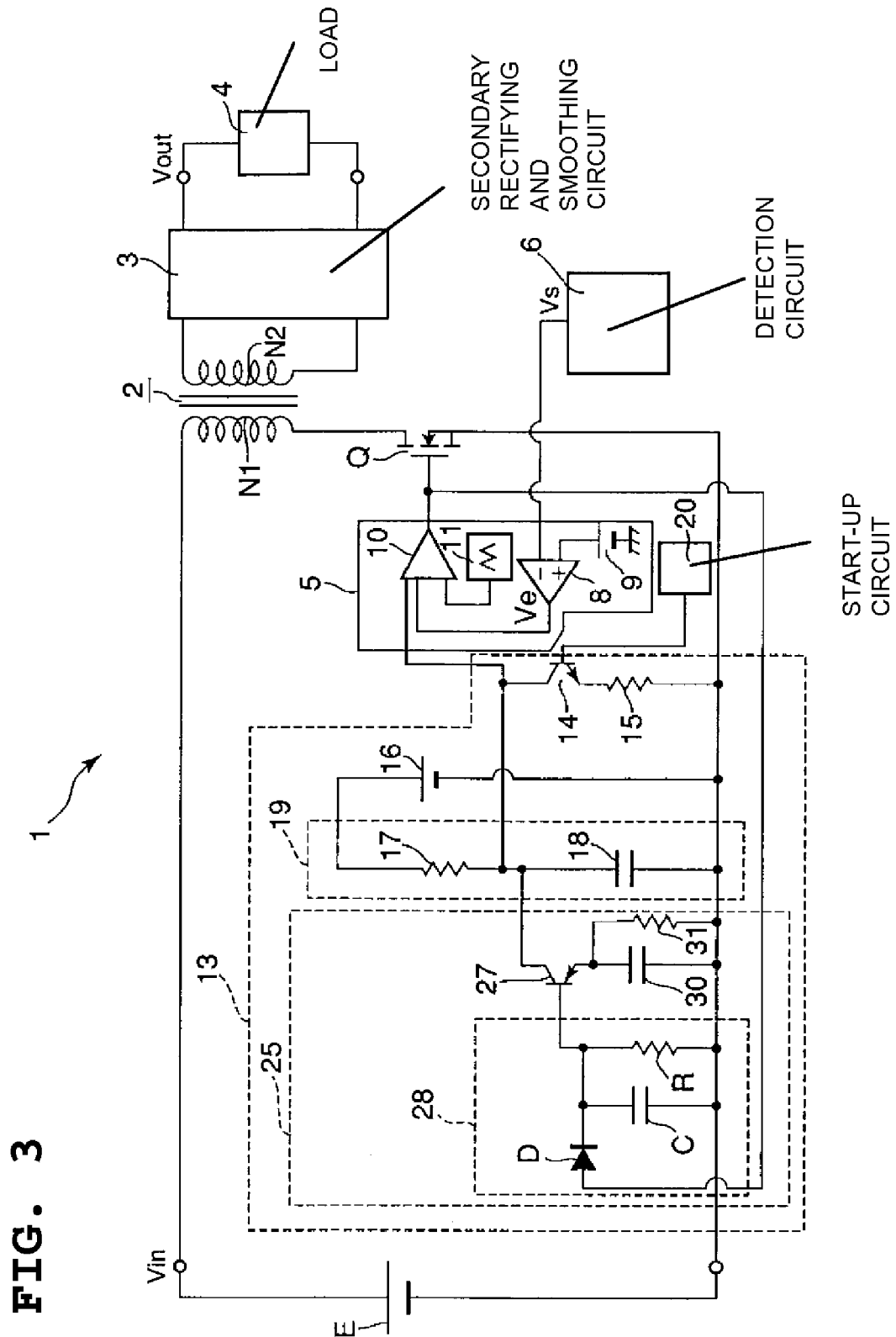
FIG. 3 is a circuit diagram depicting the main constituent parts of a switching power supply circuit according to a second preferred embodiment of the present invention.

A second present preferred embodiment of a switching power supply circuit according to the present invention will now be described. FIG. 3 shows the main circuit constituent parts of a switching power supply circuit according to the second preferred embodiment of the present invention. According to this second preferred embodiment, a time-constant switching control circuit 25 includes a circuit preferably having a switch section (e.g., transistor element) 27 and a capacitor 30 connected in series and a switch control section 28 for controlling the switching of the switch section 27. The circuit including the switch section 27 and the capacitor 30 connected in series is connected in parallel to the soft-start capacitor 18.

In the same manner in this second preferred embodiment as in the first preferred embodiment, the time-constant switching timing during the start-up time is set as a point in time when a charge voltage Vz for a soft-start capacitor 18 has reached a minimum level (signal-output starting voltage) Vlow of a triangular wave voltage S of a triangular-wave generating circuit 11.

Also in the second preferred embodiment, the signal input terminal of the switch control section 28 acquiring a signal from a control circuit 5 is connected to the conducting route of the switching-control signal from the control circuit 5 to a main switching element Q. On starting the output of the switching-control signal, the set time-constant switching timing is detected. As described above, a circuit structure is provided for switching the switch section 27 from an OFF operation to an ON operation with the time-constant switching timing by using the switching-control signal. The circuit structure of this switch control section 28 is not limited to a particular one, as long as it can control the switching of the switch section 27 from an OFF operation to an ON operation with the set time-constant switching timing during the start-up time. FIG. 3 shows one example circuit structure of the switch control section 28. More specifically, in the example of FIG. 3, the switch control section 28 includes a diode D, a smoothing capacitor C, and a resistor R.

In this second preferred embodiment, the switch section 27 is in an OFF operation during the period of time from when the switching power supply circuit 1 starts driving until the time-constant switching timing. At this time, electric current from a soft-start operation power supply 16 flows to the soft-start capacitor 18 through a resistor 17. As a result, the soft-start capacitor 18 is charged with the time constant based on the capacitance of the soft-start capacitor 18 and the resistance of the resistor 17. Also in this second preferred embodiment, in the same manner as in the first preferred embodiment, the time constant for charging the soft-start capacitor 18 during the period of time from when the switching power supply circuit 1 starts driving until the time-constant switching timing is set such that the charge voltage for the soft-start capacitor 18 sharply increases, as indicated by symbol U in FIG. 2.

After the switch section 27 has been switched from an OFF operation to an ON operation with the time-constant switching timing during the start-up time through the switching control operation of the switch control section 28, electric current from the soft-start operation power supply 16 flows to the soft-start capacitor 18 and the capacitor 30 through the resistor 17. For this reason, while the switch section 27 is in ON operation, not only does the soft-start capacitor 18 carry out charging operation but also the capacitor 30 is charged using the soft-start operation power supply 16. Therefore, the time constant for charging the soft-start capacitor 18 is based on the resistance of the resistor 17 and the capacitance of the parallel circuit composed of the soft-start capacitor 18 and the capacitor 30.

Therefore, the time constant for charging the soft-start capacitor 18 while the switch section 27 is in an ON operation causes the rising trend of the charge voltage Vz for the soft-start capacitor 18 to become more gentle than the time constant for charging while the switch section 27 is in an OFF operation. More specifically, the time constant for charging the soft-start capacitor 18 is switched as a result of the switch section 27 being switched from an OFF operation to an ON operation with the set time-constant switching timing through the switching control operation of the switch control section 28. Also in this second preferred embodiment, in the same manner as in the first preferred embodiment, the time constant for charging the soft-start capacitor 18 during the start-up time after the time-constant switching timing is set to cause the rising trend of the charge voltage for the soft-start capacitor 18 to be gentle to achieve soft start of the output voltage Vout.

More specifically, according to the second preferred embodiment, a time constant for causing the charge voltage Vz for the soft-start capacitor 18 to sharply increase is produced during the period of time from when the switching power supply circuit 1 starts driving until the time-constant switching timing. After time-constant switching timing, a time constant for causing the rising trend of the charge voltage Vz for the soft-start capacitor 18 to become gentle is produced to achieve soft start of output voltage Vout. The capacitances of the soft-start capacitor 18 and the capacitor 30 and the resistance of the resistor 17 are designed so that the time constant before the time-constant switching timing and the time constant after time-constant switching timing operate as described above.

Therefore, with the structure according to this second preferred embodiment, in the same manner as in the first preferred embodiment, the delay time is reduced from when the switching power supply circuit 1 starts driving to when output of the output voltage Vout is started. In addition, a soft start of the output voltage Vout can be achieved. In the example of FIG. 3, the capacitor 30 is connected to the ground through a resistor 31. For this reason, for example, after charging from the soft-start operation power supply 16 has been completed, the charge voltage of the capacitor 30 is discharged to the ground through the resistor 31.

The time-constant switching control circuit 25 variably switches the capacitance from among the resistance and capacitance that determine the time constant for charging the soft-start capacitor 18 (controls the start of charging the capacitor connected in parallel to the soft-start capacitor by the use of the soft-start operation power supply) to control the switching of the time constant for charging the soft-start capacitor. The time-constant switching control circuit 25 can be constructed with a simple circuit. For this reason, the circuit structure is prevented from becoming complicated and the start-up time can be reduced while soft start of the output voltage is achieved.

The present invention is not limited to the structures according to the first and second preferred embodiments. Instead, the present invention can be achieved in various embodiments. For example, in the first and second preferred embodiments, the time-constant switching timing is preferably set as a point in time when the charge voltage Vz for the soft-start capacitor 18 has reached the signal-output starting voltage Vlow. In the first and second preferred embodiments, the switching control section 28 preferably detects the time-constant switching timing with the start of output of the switching-control signal from the control circuit 5 to the main switching element Q.

Figure 4:
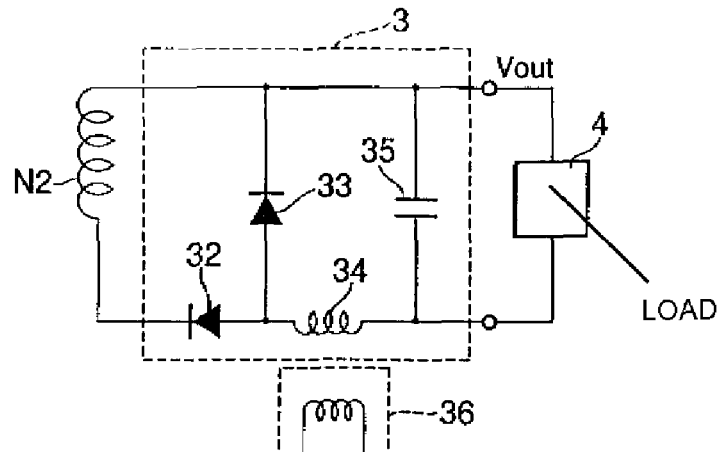
FIG. 4 is a diagram illustrating another preferred embodiment of the present invention.

As an alternative, the switch control section 28 may be constructed to detect the set time-constant switching timing, for example, with the structure described below. As described above, when the charge voltage Vz for the soft-start capacitor 18 reaches the signal-output starting voltage Vlow, output of the switching-control signal from the control circuit 5 to the main switching element Q is started. In this case, if a secondary rectifying and smoothing circuit 3 includes, for example, rectifying diodes 32 and 33, a smoothing choke coil 34, and a capacitor 35 as shown in FIG. 4, the voltage application of the choke coil 34 is started when the switching operation of the main switching element Q is started.

For this reason, a structure 36 for detecting the start of voltage application of the choke coil 34 is provided and the structure 36 is connected to the switch control section 28. The switch control section 28 may be constructed so as to recognize that the time-constant switching timing is reached when the start of a voltage application of the choke coil 34 is detected by the structure 36 to control the switching of the switch ON/OFF operation of the switch section 27. The structure 36 can be constructed by, for example, an auxiliary coil (electromagnetically coupled with the choke coil) provided at the choke coil 34, or can be constructed from another structure.

As described above, the time-constant switching timing can be detected with a simple circuit by using a structure for detecting, as the time-constant switching timing, the start of voltage application of the smoothing choke coil in the secondary rectifying and smoothing circuit provided at the secondary coil of the transformer. The time constant for charging the soft-start capacitor can be switched with a high-accuracy set time-constant switching timing.

In the first and second preferred embodiments, the time-constant switching timing during the start-up time is set when the charge voltage Vz for the soft-start capacitor 18 reaches the signal-output starting voltage Vlow. However, the time-constant switching timing is not limited to the structure of the first and second preferred embodiments. The time-constant switching timing can be set to any time as long as it is within the start-up time after the charge voltage Vz for the soft-start capacitor 18 has reached the signal-output starting voltage Vlow and it allows soft start of the output voltage Vout to be carried out through gentle charging operation for the soft-start capacitor 18 after the time-constant switching timing.

Figure 5:
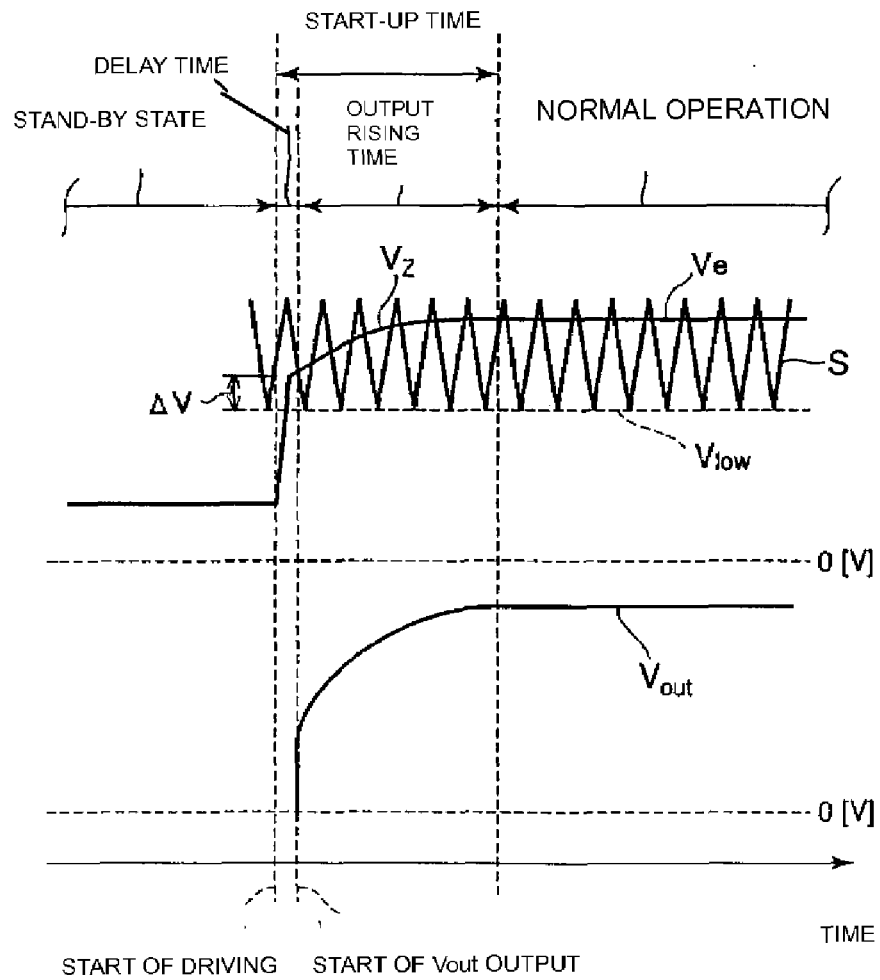
FIG. 5 is a diagram illustrating still another preferred embodiment of the present invention.

As an alternative, an example where the time-constant switching timing is set after the charge voltage Vz for the soft-start capacitor 18 has reached the signal-output starting voltage Vlow is shown in FIG. 5. FIG. 5 shows one example of the rising trend of the charge voltage Vz for the soft-start capacitor 18 and one example of the rising characteristics of the output voltage Vout. In the example of FIG. 5, the point in time when the charge voltage Vz for the soft-start capacitor 18 reaches a voltage $\Delta V$ above the signal-output starting voltage Vlow is set as the time-constant switching timing. The voltage value $\Delta V$ can be set to any value according to specifications.

Although applied to various types of switching power supply circuits, the present invention is suitable particularly for a switching power supply circuit where a main switching element in the primary circuit of a transformer is switched ON/OFF to rectify and smooth a voltage generated in the secondary of the transformer and the voltage is supplied to a load.

The invention claimed is:

1. A switching power supply circuit comprising:
a main switching element arranged to control an output voltage output from the switching power supply circuit with a switch ON/OFF operation;
a soft-start circuit arranged to output a soft-start voltage whose voltage value increases over time during a start-up time from when the switching power supply circuit starts driving to when the output voltage of the switching power supply circuit reaches a predetermined normal-operation output voltage; and
a control circuit arranged to start an output of a switching-control signal of the main switching element based on the soft-start voltage after the soft-start voltage reaches a predetermined signal-output starting voltage to control the switch ON/OFF operation of the main switching element and to cause the output voltage of the switching power supply circuit to gently rise towards the normal-operation output voltage; wherein
the soft-start circuit includes a time-constant circuit having a soft-start capacitor which is charged during the start-up time;
the soft-start circuit outputs a charge voltage of the soft-start capacitor as the soft-start voltage;
the soft-start circuit includes a time-constant switching control circuit arranged to control the switching of a time constant to charge the soft-start capacitor during the start-up time; and
the time-constant switching control circuit sets a time constant that causes the charge voltage of the soft-start capacitor to sharply increase at least until the charge voltage of the soft-start capacitor reaches the signal-output starting voltage after the switching power supply circuit starts driving and switches to a time constant that causes a rising trend of the charge voltage of the soft-start capacitor to become gentle with a predetermined time-constant switching timing after the charge voltage of the soft-start capacitor reaches the signal-output starting voltage.

2. The switching power supply circuit according to claim 1, wherein the soft-start circuit includes a soft-start operation power supply, the time-constant circuit includes a resistor connected to the soft-start operation power supply, the soft-start capacitor is connected to the soft-start operation power supply through the resistor and is charged using the soft-start operation power supply during the start-up time, the time-constant switching control circuit includes a series circuit including a resistor connected in parallel to the resistor of the time-constant circuit and a switch section and a switch control section arranged to control the switching operation of the switch section, and the switch control section controls the switching of the switch section from an ON operation to an OFF operation with the time-constant switching timing during the start-up time and switches the time constant for charging the soft-start capacitor by increasing the resistance of a charge route from the soft-start operation power supply to the soft-start capacitor.

3. The switching power supply circuit according to claim 1, wherein the soft-start circuit includes a soft-start operation power supply, the soft-start capacitor of the time-constant circuit is connected to the soft-start operation power supply and is charged during the start-up time using the soft-start operation power supply, the time-constant switching control circuit includes a series circuit including a capacitor connected in parallel to the soft-start capacitor and a switch section and a switch control section arranged to control the switching operation of the switch section, and the switch control section controls the switching of the switch section from an OFF operation to an ON operation with the time-constant switching timing during the start-up time and causes the capacitor connected to the switch section in series to start charging using the soft-start operation power supply to switch the time constant for charging the soft-start capacitor.

4. The switching power supply circuit according to claim 2, wherein the time-constant switching timing is set when the charge voltage of the soft-start capacitor reaches the signal-output starting voltage, and the switch control section of the time-constant switching control circuit detects the start of output of the switching-control signal from the control circuit to the main switching element as the time-constant switching timing to control switching of an ON/OFF operation of the switch section.

5. The switching power supply circuit according to claim 3, wherein the time-constant switching timing is set when the charge voltage of the soft-start capacitor reaches the signal-output starting voltage, and the switch control section of the time-constant switching control circuit detects the start of output of the switching-control signal from the control circuit to the main switching element as the time-constant switching timing to control switching of an ON/OFF operation of the switch section.

6. The switching power supply circuit according to claim 2, further comprising a transformer, wherein the main switching element is provided on the side of a primary coil of the transformer, and a secondary rectifying and smoothing circuit arranged to rectify and smooth a voltage output from a secondary coil based on the switch ON/OFF operation of the main switching element and output the rectified and smoothed voltage as the output voltage of the switching power supply circuit is provided on the side of the secondary coil of the transformer, wherein the time-constant switching timing is set as a point in time when the charge voltage of the soft-start capacitor reaches the signal-output starting voltage.

7. The switching power supply circuit according to claim 6, wherein the secondary rectifying and smoothing circuit includes a smoothing choke coil, and the switch control section of the time-constant switching control circuit detects a point in time when application of a voltage to the smoothing choke coil starts as the time-constant switching timing during the start-up time to control switching of an ON/OFF operation of the switch section.

8. The switching power supply circuit according to claim 3, further comprising a transformer, wherein the main switching element is provided on the side of a primary coil of the transformer, and a secondary rectifying and smoothing circuit arranged to rectify and smooth a voltage output from a secondary coil based on the switch ON/OFF operation of the main switching element and output the rectified and smoothed voltage as the output voltage of the switching power supply circuit is provided on the side of the secondary coil of the transformer, wherein the time-constant switching timing is set as a point in time when the charge voltage of the soft-start capacitor reaches the signal-output starting voltage.

9. The switching power supply circuit according to claim 8, wherein the secondary rectifying and smoothing circuit includes a smoothing choke coil, and the switch control section of the time-constant switching control circuit detects a point in time when application of a voltage to the smoothing choke coil starts as the time-constant switching timing during the start-up time to control switching of an ON/OFF operation of the switch section.

10. A switching power supply circuit comprising
a main switching element arranged to control an output voltage from the switching power supply circuit with a switch ON/OFF operation;
a soft-start circuit arranged to output a soft-start voltage whose voltage value increases over time during a start-up time from when the switching power supply circuit starts driving to when the output voltage of the switching power supply circuit reaches a predetermined normal-operation output voltage; and
a control circuit arranged to start an output of a switching-control signal of the main switching element based on the soft-start voltage after the soft-start voltage reaches a predetermined signal-output starting voltage; wherein
the soft-start circuit sets a time constant that causes the soft-start voltage to sharply increase at least until the soft-start voltage reaches the signal-output starting voltage after the switching power supply circuit starts driving and switches to a time constant that causes the soft-start voltage to gently increase with a predetermined time-constant switching timing after the charge voltage of the soft-start circuit reaches the signal-output starting voltage.

11. The switching power supply circuit according to claim 10, wherein the soft-start circuit includes a switch section and a switch control section arranged to control the switching operation of the switch section, and the switch control section controls the switching of the switch section from an ON operation to an OFF operation with the time-constant switching timing during the start-up time to increase the resistance of a charge route in the soft-start circuit.

12. The switching power supply circuit according to claim 11, wherein the time-constant switching timing is set when the charge voltage reaches the signal-output starting voltage, and the switch control section detects the start of output of the switching-control signal from the control circuit to the main switching element as the time-constant switching timing to control switching of an ON/OFF operation of the switch section.

13. The switching power supply circuit according to claim 12, further comprising a secondary rectifying and smoothing circuit arranged to rectify and smooth a voltage output from the main switching element based on the switch ON/OFF operation of the main switching element, wherein the time-constant switching timing is set as a point in time when the soft-start voltage of the soft-start circuit reaches the signal-output starting voltage.

14. The switching power supply circuit according to claim 13, wherein the secondary rectifying and smoothing circuit includes a smoothing choke coil, and the switch control section detects a point in time when application of a voltage to the smoothing choke coil starts as the time-constant switching timing during the start-up time to control switching of an ON/OFF operation of the switch section.

15. The switching power supply circuit according to claim 10, wherein the soft-start circuit includes a switch section and a switch control section arranged to control the switching operation of the switch section, and the switch control section controls the switching of the switch section from an OFF operation to an ON operation with the time-constant switching timing during the start-up time.

16. The switching power supply circuit according to claim 15, wherein the time-constant switching timing is set when the charge voltage reaches the signal-output starting voltage, and the switch control section detects the start of output of the switching-control signal from the control circuit to the main switching element as the time-constant switching timing to control switching of an ON/OFF operation of the switch section.

17. The switching power supply circuit according to claim 15, further comprising a secondary rectifying and smoothing circuit arranged to rectify and smooth a voltage output from the main switching element based on the switch ON/OFF operation of the main switching element, wherein the time-constant switching timing is set as a point in time when the soft-start voltage of the soft-start circuit reaches the signal-output starting voltage.

18. The switching power supply circuit according to claim 17, wherein the secondary rectifying and smoothing circuit includes a smoothing choke coil, and the switch control section detects a point in time when application of a voltage to the smoothing choke coil starts as the time-constant switching timing during the start-up time to control switching of an ON/OFF operation of the switch section.

* * * * *